(12) United States Patent
Lapshina et al.

(10) Patent No.: US 8,097,064 B2
(45) Date of Patent: Jan. 17, 2012

(54) METHODS FOR CHEMICAL RECOVERY OF NON-CARRIER-ADDED RADIOACTIVE TIN FROM IRRADIATED INTERMETALLIC TI-SB TARGETS

(75) Inventors: Elena V. Lapshina, Troitsk (RU); Boris L. Zhuikov, Troitsk (RU); Suresh C. Srivastava, Setauket, NY (US); Stanislav V. Ermolaev, Obninsk (RU); Natalia R. Togaeva, Obninsk (RU)

(73) Assignee: Brookhaven Science Associates, Upton, NY (US)

( * ) Notice: Subject to any disclaimer, the term of this patent is extended or adjusted under 35 U.S.C. 154(b) by 290 days.

(21) Appl. No.: 12/425,038

(22) Filed: Apr. 16, 2009

(65) Prior Publication Data

US 2010/0064853 A1 Mar. 18, 2010

(30) Foreign Application Priority Data

Sep. 12, 1920 (RU) .................................. 2008136586

(51) Int. Cl.
*C22B 25/00* (2006.01)
(52) U.S. Cl. ............................... 75/393; 75/743; 423/98
(58) Field of Classification Search .................... 75/393, 75/743; 205/610–614; 423/98; 424/1.61
See application file for complete search history.

(56) References Cited

U.S. PATENT DOCUMENTS

| 5,342,283 A | 8/1994 | Good |
| 5,425,063 A | 6/1995 | Ferrieri et al. |
| 2007/0034373 A1 | 2/2007 | McDaniel et al. |
| 2010/0166653 A1* | 7/2010 | Stevenson et al. ........... 424/1.61 |

* cited by examiner

*Primary Examiner* — George Wyszomierski
*Assistant Examiner* — Mark L Shevin
(74) *Attorney, Agent, or Firm* — Wood, Herron & Evans, LLP

(57) ABSTRACT

The invention provides a method of chemical recovery of no-carrier-added radioactive tin (NCA radiotin) from intermetallide TiSb irradiated with accelerated charged particles. An irradiated sample of TiSb can be dissolved in acidic solutions. Antimony can be removed from the solution by extraction with dibutyl ether. Titanium in the form of peroxide can be separated from tin using chromatography on strong anion-exchange resin. In another embodiment NCA radiotin can be separated from iodide solution containing titanium by extraction with benzene, toluene or chloroform. NCA radiotin can be finally purified from the remaining antimony and other impurities using chromatography on silica gel. NCA tin-117m can be obtained from this process. NCA tin-117m can be used for labeling organic compounds and biological objects to be applied in medicine for imaging and therapy of various diseases.

24 Claims, No Drawings

METHODS FOR CHEMICAL RECOVERY OF NON-CARRIER-ADDED RADIOACTIVE TIN FROM IRRADIATED INTERMETALLIC TI-SB TARGETS

This invention was made with Government support under contract number DE-AC02-98CH10886, awarded by the U.S. Department of Energy. The Government has certain rights in the invention.

FIELD OF THE INVENTION

The invention relates to nuclear technology and radiochemistry, and more specifically, to the radiochemical procedure of recovery for a radionuclide of tin in no-carrier-added (NCA) form for labeling organic compounds and biological materials and for molecular imaging and therapy of various diseases.

BACKGROUND OF THE INVENTION

The chemical isolation of tin from alloys containing titanium, antimony, vanadium and other elements can be accomplished (A. M. Leblond, R. Boulin, Dosage de l'étain dans les métaux ferreux, Méthode spectrophotométrique á la phénylfluorone, Chim. analyt., 50, 171-177 (1968)). The method consists of sample dissolution in the mixture of solutions of perchloric ($HClO_4$) and sulfuric ($H_2SO_4$) acid, extraction of tin with benzene followed by re-extraction of tin with diluted solution of $H_2SO_4$. Since the method is only applied for spectrophotometric determination of tin, it does not provide high chemical purity tin, especially radioactive tin in NCA form (NCA radiotin) which must be separated from macroamounts of antimony and titanium as well as from radionuclides of tellurium, indium, vanadium and scandium generated under irradiation of TiSb with accelerated charged particles.

One method for the chemical recovery of NCA radiotin is based on the procedure of processing the targets containing natural or enriched metallic antimony (L. F. Mausner et al., Nuclear data for production of Sn-117m for biomedical application, J. Radiation Effects, 94, 50-63 (1986)). The method includes dissolution of antimony irradiated with accelerated charged particles followed by precipitation of tellurium using sulfur dioxide and chromatographic isolation of NCA radiotin using an anion exchange resin and solutions of hydrochloric (HCl) and $HClO_4$. However, the method does not provide purification of radiotin from titanium, so it does not allow titanium-containing materials to be processed. Another disadvantage of the method is low level of radionuclidic purity, because the radiochemical procedure of radiotin recovery is elaborated for cross section measurements rather than for medical applications.

Another method for the chemical recovery of NCA radiotin deals with the irradiated targets of metallic antimony in the form of a massive monolith sample in a hermetic shell (B. L. Zhuikov et al., Process and targets for production of no-carrier-added radiotin, RF Patent No. 2313838 (2007)). The radiochemical procedure comprises dissolution of irradiated antimony followed by extraction of antimony with dibutyl ether and chromatographic purification of radiotin on silica gel from isotopes of tellurium and indium as well as from the traces of antimony. However, the method is only developed for processing metallic antimony which has low heat conductivity and melting point as well as high vapor pressure. As a result, maximal current of accelerated charged particles is restricted to a certain low value depending on target thickness, material of the shell, efficiency of the cooling system and beam geometry.

Producing NCA radiotin may be more effective if more temperature resistant material such as intermetallide TiSb is used instead of antimony (J. L. Murray, Binary Alloy Phase Diagrams, Second Edition, Ed. T. B. Massalski, ASM International, Materials Park, Ohio, 3, 3311-3312 (1990); H. Nowotny, J. Pesl, Untersuchungen im system Titan-antimon, Monatshefte fuer Chemie, 82, 336-343 (1951)). Thus, the development of procedure for chemical recovery of radiotin from irradiated TiSb is desirable.

SUMMARY OF THE INVENTION

Tin-117m is formed in extremely low concentration from antimony by irradiating intermetallic TiSb. To separate the tin from the TiSb, the irradiated TiSb is partly dissolved in boiling concentrated HCl. The solution is separated and hydrogen peroxide ($H_2O_2$) is added into the solution after boiling to oxidize titanium to a higher valence state. The solution is then heated to destroy the rest of $H_2O_2$. The rest of TiSb sample can be then dissolved in concentrated HCl with addition of concentrated nitric acid ($HNO_3$) in amounts typically not less than $\frac{1}{20}^{th}$ of the volume of HCl. (Two-step dissolution is used for avoiding inhibition of the dissolution due to surface passivation.)

When the dissolution is finished, both solutions are combined. If the solution concentration differs from 9 M to 12 M HCl and 0.1 M to 0.6 M Sb, the solution can be adjusted to a concentration of 9 M to 12 M HCl and 0.1 M to 0.6 M Sb by evaporation, dilution with water, or addition of concentrated HCl. To extract Sb from the solution, dibutyl ether can be added to the solution, where dibutyl ether is saturated with 9-12 M HCl. The volume ratio of TiSb-solution to dibutyl ether ranges from 1:1 to 1:1.5 by volume. The organic and water phases are mixed and then permitted to settle. The organic phase containing Sb is removed.

The water phase can be adjusted to a concentration of 5 M to 7 M HCl by evaporation, dilution with water, or addition of concentrated HCl. The $H_2O_2$ is then added so that the molar ratio $H_2O_2$:Ti ranges from 1:1 to 1.5:1. The solution can be passed through a chromatographic column filled with strong anion-exchange resin. Sn is adsorbed while Ti and radioisotopes of indium (In) and scandium (Sc) pass through the column and can be washed out with 5-7 M HCl. Sn can be desorbed from the anion-exchange resin with 1-4 M $HNO_3$. Sodium citrate can be added into the radiotin desorbate to achieve a concentration of citrate ions in the resulting solution not less than 0.5 M and not less than five times more than the Sb-concentration in the solution. The excess $H^+$ ions in the solution can be neutralized by adding alkali to achieve a pH ranging from pH 4.5 to pH 6.

To further separate NCA radiotin from Sb and other impurities, the solution can be passed through a chromatographic column filled with hydrated silicon dioxide $SiO_2 \times H_2O$ (silica gel), as Sn is preferentially adsorbed by the silica gel. The remaining amounts of Sb and radioactive tellurium (Te) and vanadium (V) can be washed from the silica gel using a citrate solution with pH ranging from pH 4.5 to pH 6.0, and followed by water with citric acid at a pH ranging from pH 4.5 to pH 6.0. NCA radiotin can be desorbed from the silica gel with an inorganic acid at a concentration ranging from 5 M to 7 M.

In another embodiment of the invention, the water phase after extraction of Sb can be adjusted to a concentration of 1 M to 3 M HCl by dilution with water. The solution can be heated, Ti is precipitated in the form of hydroxide and hydroxichloride compounds (to avoid precipitation of Ti during the stage of following chromatographic purification) and the solution can be filtered.

Sodium citrate can be added into the filtrate to achieve a concentration of citrate ions in the resulting solution not less than 0.5 M and not less than five times more than the Sb-concentration in the solution. The excess $H^+$ ions in the solution can be neutralized by adding alkali to achieve a pH ranging from pH 4.5 to pH 6.0. The solution can be passed through a chromatographic column filled with silica gel which absorbs Sn. The traces of Sb as well as radioisotopes of Te, In, Sc, and V can be washed from the silica gel using a citrate solution with a pH ranging from 4.5 to 6.0 and followed by water with citric acid at a pH ranging from pH 4.5 to pH 6.0. Sn can be desorbed from the silica gel by 5-7 M $HClO_4$.

The solution can be adjusted to a concentration of 4 M to 6 M $HClO_4$, 0.5 to 1.5 $H_2SO_4$ and 0.5 to 1 M potassium iodide (KI) by adding reagents, dilution with water or evaporation. To separate Sn from the remaining amounts of Ti, benzene (as well toluene or chloroform or similar substances) can be added to the solution, where benzene is saturated with the mixture of 4-6 M $HClO_4$ and 0.5-1.5 M $H_2SO_4$. The volume ratio of the aqueous solution and benzene ranges from 4:1 to 2:1. The organic and water phases are mixed and then permitted to settle and the aqueous phase is removed. Sn can be re-extracted from the organic phase with 0.5-2 M HCl. The volume ratio of the aqueous and organic phases ranges from 4:1 to 2:1. The organic and water phases are mixed and then permitted to settle and the organic phase is removed.

Sodium citrate can be added into the water phase to achieve a concentration of citrate ions in the resulting solution of not less than 0.5 M and not less than five times more than the Sb concentration in the solution. The excess $H^+$ ions in the solution can be neutralized by adding alkali to achieve a pH ranging from pH 4.5 to pH 6. The solution can be passed through a chromatographic column filled with silica gel. Sn is adsorbed while the traces of Sb and radioisotopes of Te and V pass through the column and can be washed using a citrate solution with pH ranging from pH 4.5 to pH 6.0, and followed by water with citric acid at a pH ranging from pH 4.5 to pH 6.0. NCA radiotin can be desorbed from the silica get by inorganic acid at a concentration ranging from 5 M to 7 M.

These and other embodiments will be apparent form the following detailed description and examples.

DETAILED DESCRIPTION OF THE INVENTION

Radiotin is formed by irradiating antimony which is in a titanium antimony intermetallic. The tin is present in extremely low concentrations, generally about less than $2\times10^{-5}$ g Sn per gram of target material. The present invention provides a method of chemical recovery of the NCA radiotin from intermetallide TiSb irradiated with accelerated charged particles. The method comprises dissolution of the TiSb sample in acidic solutions, extraction of Sb with dibutyl ether and chromatographic separation from Ti in the form of peroxide on a strong anion-exchange resin.

In another embodiment of the invention, Sn can be separated from an iodide solution containing titanium by extraction with benzene, toluene or chloroform. Sn (for example, NCA radiotin or NCA tin-117m) can be finally purified from the remaining antimony and other impurities using chromatography on silica gel.

The irradiated TiSb is dissolved in a 6-10-fold molar excess of boiling concentrated HCl, and the solution is separated. The rest of the TiSb sample can be subject to one to two additional stages of dissolution in a fresh portion of boiling concentrated HCl. $H_2O_2$ can be added into the solutions after boiling and the solutions can be heated to destroy the rest of $H_2O_2$.

The remaining TiSb sample can be then dissolved in a 6-10-fold molar excess of concentrated HCl with addition of concentrated $HNO_3$ in amounts typically not less than $\frac{1}{20}^{th}$ of the volume of HCl. The latter solution can be filtered, all the solutions can be combined and the rest of the $HNO_3$ is removed by heating. If the solution concentration differs from 9 M to 12 M HCl and 0.1 M to 0.6 M Sb, the solution can be adjusted to a concentration of 9 M to 12 M HCl and 0.1 M to 0.6 M Sb by evaporation, dilution with water, or addition of concentrated HCl.

After dissolution, the aqueous solution is extracted with an organic phase. Dibutyl ether is used as the organic phase. In this embodiment, dibutyl ether is saturated with 9-12 M HCl and then added to the TiSb solution. The ratio of aqueous volume and dibutyl ether volume can be 1:1-1:1.5. The composition is mixed for 2 to 20 (or 5 or 10) minutes to facilitate antimony extraction, and then allowed to phase separate for 15 to 120 (or 30 or 60) minutes. The organic phase containing antimony is separated from the aqueous phase. To further remove antimony and other unwanted materials, the water phase remaining after extraction can be subject to two to four additional extraction stages, again using an organic phase such as dibutyl ether.

After the extractions, the aqueous phase is passed through a column to remove at least one of Ti, a radioisotope of In, or a radioisotope of Sc. The water phase can be adjusted to a concentration of 5 M to 7 M HCl by evaporation, dilution with water, or addition of concentrated HCl. Then the aqueous phase is prepared for the column by adding $H_2O_2$ so that the molar ratio $H_2O_2$:Ti ranges from 1:1 to 1.5:1.

The column is filled with a strong anion-exchange resin. Sn is adsorbed while Ti and radioisotopes of In and Sc pass through the column and can be washed out with 5-7 M HCl Sn can be desorbed from the anion-exchange resin with 1-4 M $HNO_3$. The length of the column filled with strong anion-exchange resin can be 5-15 cm and the diameter can be 0.5-1.5 cm. The strong anion-exchange resin grain size can be 0.03-0.4 mm. The sorbent washing solution (to remove Ti as well as radioisotopes of In and Sc and other unwanted materials) can be 50-200 ml of 5-7 M HCl. Sn can be desorbed from the column using 20-50 ml of 1-4 M $HNO_3$ heated to 30-100° C.

After the chromatographic separation of Ti, the desorbate can then be passed through a column to further purify the NCA radiotin. The desorbate can be prepared for the column by adding, for example, sodium citrate so that the citrate concentration is no less than 0.5 M and not less than five times the concentration of the antimony in the solution. The pH can be adjusted to the range of 4.5-6.0 by the addition of the alkali, or to a pH of 5.4, 5.5, or 5.6.

The column can be a chromatography column filled with silica gel. Sn is adsorbed on the surface of the silica gel and the column can be washed of the traces of Sb as well as radioisotopes of Te, In, Sc and V with a sodium citrate solution of the same concentration at pH 4.5-6.0, and then with water with citric acid at a pH 4.5-6.0. Sn can be desorbed from the silica gel column by $HClO_4$. The silica gel can be 5-15 cm and the diameter can be 0.5-1.5 cm. The silica gel grain size can be 0.05 mm-0.4 mm. The sorbent washing solution can be 20 ml-70 ml of sodium citrate at a pH 4.5-6.0 or 5.4-5.6. Additional washes can include 30 ml-100 ml of water containing citric acid at a pH 4.5-6.0 or 5.4-5.6. Additional washes can include 30 ml-100 ml or water containing citric acid at a pH 4.5-6.0 or 5.4-5.6. The solutions can be passed through the column at a rate of 0.1 ml/min to 3 ml/min. Sn can be desorbed from the column using 5-40 ml or 5-7 M $HClO_4$.

After the preliminary chromatographic purification, the desorbate can be prepared for separation of Sn from the remaining amounts of Ti by extraction. The solution can be adjusted to a concentration of 4 M to 6 M $HClO_4$ and 0.5 to 1 M KI by careful mixing the reagents, adding to the desorbate, dilution with water or evaporation. Benzene, toluene or chloroform can be used as the organic phase. In this embodiment, benzene is saturated with the mixture of 4-6 M $HClO_4$ and 0.5-1.5 M $H_2SO_4$ and then added to the prepared aqueous solution. The ratio of aqueous volume and benzene volume can be 4:1-2:1. The composition is mixed for 10 to 200 (or 20 or 100) seconds to facilitate Sn extraction, and then allowed to phase separate for 1 to 20 (or 2 or 10) minutes. The organic phase can be then added to 0.5-2 M HCl to re-extract Sn. The ratio of HCl solution volume and organic phase volume can be 4:1-2:1. The composition is mixed for 1 to 10 (or 2 or 6) minutes to facilitate Sn re-extraction, and then allowed to phase separate for 3 to 30 (or 5 or 20) minutes.

After the extraction of Ti, the re-extract can then be passed through a column to further purify the NCA radiotin. The re-extract can be prepared for the column by adding, for example, sodium citrate so that the citrate concentration is not less than 0.5 M and not less than five times the concentration of the antimony in the solution. The pH can be adjusted to the range of 4.5-6.0 by the addition of the alkali, or to a pH of 5.4, 5.5, or 5.6.

The column can be a chromatography column filled with silica gel. Sn is adsorbed on the surface of the silica gel and the column is washed of the traces of Sb and radioactive Te and V with a sodium citrate solution of the same concentration at pH 4.5-6.0, and then with water comprising citric acid (pH 4.5-6.0). NCA radiotin can be desorbed from the silica gel column by an inorganic acid at a concentration in the range of 5 M to 7 M. The silica gel column length can be 5-15 cm and the diameter can be 0.5-1.5 cm. The silica gel grain size can be 0.05 mm-0.4 mm. The sorbent washing solution can be 20 ml-70 ml of sodium citrate at a pH 4.5-6.0 or 5.4-5.6. The solutions can be passed through the column at a rate of 0.1 ml/min to 3 ml/min. Tin can be desorbed from the column using 5 ml to 20 ml of an inorganic acid, e.g., 6 M HCl. The obtained material can be subjected to one additional chromatographic runs to further purify the NCA radiotin, as described above.

In another embodiment of the invention, the water phase after the extractions of Sb can be adjusted to a concentration of 1 M to 3 M HCl by dilution with water. The solution can be heated for several hours, while Ti compounds are precipitated from the boiling solution and the solution can be filtered.

After the filtration, the solution can be passed through a column for preliminary chromatographic purification. The solution can be prepared for the column by adding, for example, sodium citrate so that the citrate concentration is not less than 0.5 M and not less than five times the concentration of antimony in the solution. The pH can be adjusted to the range of 4.5-6.0 by the addition of the alkali, or to a pH of 5.4, 5.5, or 5.6.

The column can be a chromatography column filled with silica gel. Sn is adsorbed on the surface of the silica gel and the column can be washed from the traces of Sb as well as radioisotopes of Te, In, Sc and V with a sodium citrate solution of the same concentration at pH 4.5-6.0, and then with water comprising citric acid (pH 4.5-6.0). Sn can be desorbed from the silica gel column by $HClO_4$ solution. The silica gel column length can be 5-15 cm and the diameter can be 0.5-1.5 cm. The silica gel grain size can be 0.05 mm-0.4 mm. The sorbent washing solution can be 20 ml-70 ml of sodium citrate at a pH 4.5-6.0 or 5.4-5.6. Additional washes can include 30 ml-100 ml of water containing citric acid at a pH 4.5-6.0 or 5.4-5.6. The solutions can be passed through the column at a rate of 0.1 ml/min to 3 ml/min. Sn can be desorbed from the column using 5-40 ml or 5-7 M $HClO_4$.

After the preliminary chromatographic purification, the desorbate can be prepared for separation of Sn from the remaining amounts of Ti by extraction. The solution can be adjusted to a concentration of 4 M to 6 M $HClO_4$, 0.5 to 1.5 M $H_2SO_4$ and 0.5 to 1 M KI by carefully mixing the reagents, adding to the desorbate, dilution with water or evaporation. Benzene, toluene or chloroform can be used as the organic phase. In this embodiment, benzene is saturated with the mixture of 4-6 M $HClO_4$ and 0.5-1.5 M $H_2SO_4$ and then added to the prepared aqueous solution. The ratio of aqueous volume and benzene volume can be 4:1-2:1. The composition is mixed for 10 to 200 (or 20 or 100) seconds to facilitate Sn extraction, and then allowed to phase separate for 1 to 20 (or 2 or 10) minutes. The organic phase can be then added to 0.5-2 M HCl to re-extract Sn. The ratio of HCl solution volume and organic phase volume can be 4:1-2:1. The composition is mixed for 1 to 10 (or 2 or 6) minutes to facilitate Sn re-extraction, and then allowed to phase separate for 3 to 30 (or 5 or 20) minutes.

After the extraction of Ti, the re-extract can then be passed through a column to further purify the NCA rediotin. The re-extract can be prepared for the column by adding, for example, sodium citrate so that the citrate concentration is not less than 0.5 and not less than five times the concentration of the antimony in the solution. The pH can be adjusted to the range of 4.5-6.0 by the addition of the alkali, or to a pH of 5.4, 5.5, or 5.6.

The column can be a chromatographic column filled with silica gel. Sn is adsorbed on the surface of the silica gel and the column is washed of the traces of Sb and radioactive Te and V with a sodium citrate solution of the same concentration at pH 4.5-6.0, and then with water comprising citric acid (pH 4.5-6.0). NCA radiotin can be desorbed from the silica gel column by an inorganic acid at a concentration in the range of 5 M to 7 M. The silica gel column length can be 5-15 cm and the diameter can be 0.5-1.5 cm. The silica gel grain size can be 0.05 mm-0.4 mm. The sorbent washing solution can be 20 ml-70 ml of sodium citrate at a pH 4.5-6.0 or 5.4-5.6. Additional washes can include 30 ml-100 ml of water containing citric acid at a pH 4.5-6.0 or 5.4-5.6. The solutions can be passed through the column at a rate of 0.1 ml/min to 3 ml/min, NCA radiotin can be desorbed from the column using 5 ml to 20 ml of an inorganic acid, e.g., 6 M HCl. The obtained material can be subjected to one additional chromatographic run to further purify the NCA radiotin, as described above.

After one or more of the aforementioned procedures, the NCA radiotin can be conditioned as desired, e.g., by volume adjustment (via dilution or evaporation). The finished product may also be packaged for storage or shipment. Additionally, the NCA radiotin may be processed for use in labeling organic compounds and biological objects to be applied in medicine for therapy of various diseases.

The invention will be further appreciated in light of the following examples.

Example 1

A 49 g sample of proton irradiated intermetallide TiSb (Sn concentration about $1.5 \times 10^{-5}$ g Sn per gram of target material) was put in a flask with a backflow condenser, 150 ml of concentrated (36 mass %) HCl was added and the solution was boiled for 7 hours. The solution was decanted to a container and 150 ml of concentrated HCl was added to the rest of the TiSb sample. The operation was repeated 2 times. Decreasing the number of boiling stages below two did not provide the required extent of dissolution. Increasing the number of boiling stages above three resulted in longer processing procedures and a growth of solution volume, without considerably improved dissolution. 25-30 ml of 30% $H_2O_2$ was added drop-by-drop under stirring into the container of initial solution, and then the excess of $H_2O_2$ was removed by heating for an hour.

The rest of the TiSb sample was dissolved with 150 ml of concentrated HCl adding $HNO_3$ over several hours (concentration of initial $HNO_3$ was 56 mass %, the total used volume was one-seventh a volume of HCl). A slow dissolution rate was maintained to avoid overheating and excess bubble release. The resulting solution was carefully heated to remove traces of $HNO_3$ and filtered into the container of initial solution. The volume of the solution obtained was 570 ml to 600 ml.

The solution was adjusted to 10 M HCl and its volume was increased to 1350 ml to 1400 ml. Dibutyl ether ($Bu_2O$) was saturated with an equal volume of 10 M HCl by vigorous stirring over five minutes. Equal volumes of aqueous and organic phases were also used for extraction of Sb. Four extraction stages were carried out. Decreasing the number of extraction stages below three resulted in less efficient Sb extraction. Increasing the number of extraction stages above five resulted in increased Sn loss and longer processing procedures, without considerably improved purification. Each mixing (under intensive air bubbling) lasted five minutes; each phase separation controlled visually lasted 30 minutes.

500 ml of water was added to the aqueous solution after the extractions, and then 40 ml of 30% $H_2O_2$ was added drop-by-drop under stirring. The solution was passed through a chromatographic column filled with strong anion-exchange resin AG 1×8. The solution flow rate through the column ranged from 1 ml/min to 2 ml/min. The column was 12 cm long and 1 cm wide. The column was filled with grains of 0.15 mm to 0.2 mm. Sn was adsorbed by the column, while Ti and radioisotopes of In and Sc passed through and were washed of the column with 70 ml of 6 M HCl. Sn was eluted from the column with 30 ml of 2 M $HNO_3$ heated to 60-70° C. When $HNO_3$ solution was used under ambient temperature the efficiency of Sn desorption was significantly decreased.

Sodium citrate was added to the desorbate so that the concentration of citrate ions was 0.5 M. The solution was then neutralized to pH 5.5 with NaOH and passed through a chromatographic column filled with silica gel. The solution flow rate through the column ranged from 0.3 ml/min to 0.4 ml/min. The column was 7 cm long and 0.5 cm in diameter. The column was filled with grains of 0.1 mm to 0.2 mm. Sn was adsorbed and the column was successively washed with 40 ml of 0.5 sodium citrate and 30 ml of water acidified by citric acid. The pH values of both washing solutions were adjusted to pH 5.5. $^{117m}$Sn was eluted from the column with 15 ml 6 M HCl and the stage of chromatographic purification on silica gel was repeated. The chemical yield of NCA radiotin ($^{117m}$Sn) reached 82-85%, radionuclidic purity of $^{117m}$Sn was higher than 99.6% ($^{113}$Sn not included, calibration date was the 21$^{st}$ day after the end of irradiation).

Example 2

A 44 g sample of proton irradiated intermetallide TiSb was divided into two equal parts (to test different ways of dissolution); each part was put in a flask with a backflow condenser. In the first flask, the TiSb sample was dissolved with 100 ml of concentrated (36 mass %) HCl while gradually adding concentrated (56 mass %) $HNO_3$. The solution was heated for 1-2 hours, then the dissolution rate noticeably decreased and a white suspension began to form and a precipitate covered the flask bottom and the TiSb sample. As a result, the oxide film as well as the precipitation layer covering the TiSb particles blocked further dissolution.

100 ml of concentrated HCl was added into the second flask and the solution was boiled for 6 hours. Then the solution of deep purple color was decanted to a container of initial solution and 70 ml of concentrated HCl was again added to the rest of TiSb sample. The solution was again boiled for 6 hours, and then decanted to the container of initial solution. 10 ml of 30% $H_2O_2$ was added drop-by-drop under stirring into the container of initial solution (the color changed to brown), and then the excess of $H_2O_2$ was removed by heating for an hour while the color became yellow.

The rest of the TiSb sample was dissolved with 50 ml of concentrated HCl adding $HNO_3$ over several hours (concentration of initial $HNO_3$ was 56 mass %, the total used volume was one-seventh a volume of HCl). The resulting solution was carefully heated to remove traces of $HNO_3$ and filtered into the container of initial solution. The volume of the solution obtained was 210 ml to 220 ml.

The solution was adjusted to 10 M HCl and its volume was increased to 560-580 ml. Dibutyl ether was saturated with equal volume of 10M HCl by vigorous stirring over five minutes. Equal volumes of aqueous and organic phases were also used to extract Sb. Three extraction stages were carried out. The solution was agitated (under intensive air bubbling) for 10 minutes. The phase separation was determined visually and took 40 minutes.

The aqueous phase after the extractions was evaporated to diminish the solution volume to 200-220 ml. The solution was adjusted to 2 M HCl and Ti was precipitated in the form of hydroxide and hydroxichloride by means of boiling for 7-9 hours, and then the precipitation was filtered. $Na_3Cit$ was added to the filtrate so that the concentration of citric ions was 0.5 M. The solution was then neutralized to pH 5.5 with NaOH and passed through a chromatographic column filled with silica gel. The solution flow rate through the column was ~1 ml/min. Height and diameter of the column were 15 cm and 1.2 cm, respectively. The column was filled with grains of 0.2 mm to 0.3 mm. Sn was adsorbed and the column was successively washed with 40 ml of 0.5 M sodium citrate and 30 ml of water acidified by citric acid. The pH values of both washing solutions were adjusted to pH 5.5. Sn was eluted from the column with 30 ml of 6 M $HClO_4$. KI and $H_2SO_4$ were added to the eluate so that the solution contained 4.5 M $HClO_4$, 1 M $H_2SO_4$ and 1 M KI. Then 15 ml of benzene saturated with the mixture of 4.5 M $HClO_4$ and 1 M $H_2SO_4$ was added to the obtained aqueous solution. The mixing (under intensive air bubbling) was 40 seconds; the phase separation controlled visually was 3 minutes, and then the aqueous phase containing the rest of Ti was separated. 40 ml of 1 M HCl was added to the organic phase containing Sn. The mixture was vigorously stirred for 4 minutes, and then allowed to phase separate for 10 minutes.

After removal of the organic phase, $Na_3Cit$ was added to the aqueous phase so that the concentration of citric ions was 0.5 M. The solution was then neutralized to pH 5.5 with NaOH and passed through a chromatographic column filled with silica gel. The solution flow rate through the column ranged from 0.3 ml/min to 0.4 ml/min. The second silica gel column was 7 cm long and 0.5 cm in diameter. The column was filled with grains of 0.1 mm to 0.2 mm. Sn was adsorbed and the column was successively washed with 40 ml of 0.5 M sodium citrate and 30 ml of water acidified by citric acid. The pH values of both washing solutions were adjusted to pH 5.5. $^{117m}$Sn was eluted from the column with 10 ml 6 M HCl. The chemical yield of NCA radiotin ($^{117m}$Sn) was estimated at 75-78%, radionuclidic purity of $^{117m}$Sn was higher than 99.2% ($^{113}$Sn not included, calibration date was the 20$^{th}$ day after the end of irradiation).

Thus, this invention provides an effective method of chemical recovery of NCA radiotin (for example, $^{117m}$Sn) from the thick massive targets made of intermetallide TiSb and irradiated with accelerated charged particles. This $^{117m}$Sn product may be used in bone cancer therapy, in therapy of cardiovascular disease, in therapy of other diseases. The method provided purification coefficients from Sb and Ti $5 \cdot 10^5$ to $2 \cdot 10^6$ and higher if needed. Radionuclidic purity of $^{117m}$Sn achieved after irradiation was 99% ($^{113}$Sn was not taken into account) and higher if needed.

Other variations and embodiments will be apparent to one of ordinary skill in the art from the above description and examples. Thus, the foregoing embodiments are not to be construed as limiting the scope of the following claims.

While the foregoing description has set forth preferred embodiments of the present invention in particular detail, it must be understood that numerous modifications, substitutions, and changes can be undertaken without departing from the true spirit and scope of the present invention as defined by the ensuing claims. The invention is therefore not limited to specific embodiments as described but is only limited as defined by the following claims.

What is claimed is:

1. A method of chemical recovery of no-carrier-added radioactive tin (NCA radiotin) from a sample of intermetallic TiSb irradiated with accelerated charged particles, the method comprising
    (a) dissolving at least a portion of the irradiated TiSb sample in an aqueous solution of hydrochloric acid (HCl),
    (b) dissolving the remaining portion of the irradiated TiSb in an aqueous solution comprising a volume of HCl and a volume of nitric acid (HNO$_3$),
    (c) combining the aqueous solution of step (a) with the aqueous solution of step (b) to form a combined aqueous solution extracting antimony from the combined aqueous solution with an organic phase to form an extracted aqueous solution phase containing the NCA radiotin.

2. The method of claim 1 further comprising
    (d) separating NCA radiotin from the extracted aqueous solution phase by chromatography on an anion-exchange resin,
    (e) purifying said NCA radiotin by chromatography on hydrated silicon dioxide (silica gel).

3. The method of claim 2 wherein NCA radiotin is separated from at least one of titanium, a radioisotope of indium, and a radioisotope of scandium using chromatography of the extracted aqueous phase on an anion-exchange resin in a column.

4. The method of claim 3 wherein, after sorption, the column is washed by HCl at a concentration ranging from 5 M to 7 M.

5. The method of claim 4 wherein the washing is processed with from 50 ml to 200 ml of HCl.

6. The method of claim 3 wherein NCA radiotin in said column is eluted from the column by HNO$_3$ at a concentration ranging from 1 M to 4 M.

7. The method of claim 6 wherein from 20 ml to 50 ml of HNO$_3$ are added to said column.

8. The method of claim 3 wherein radiotin in said column is processed in a solution containing citric ions at a concentration at least five times higher than antimony concentrations, but not lower than 0.5 M.

9. The method of claim 8 wherein NCA radiotin in said column is eluted by HCl at a concentration ranging from 5 M to 7 M.

10. The method of claim 2 wherein said NCA radiotin is purified from at least one of antimony, a radioisotope of tellurium, and a radioisotope of vanadium using at least one chromatographic run with silica gel.

11. The method of claim 1 further comprising
    (f) precipitating titanium compounds from the extracted aqueous solution phase.

12. The method of claim 11 wherein NCA radiotin is extracted with an organic phase from titanium dissolved in the aqueous phase.

13. The method of claim 12 wherein the aqueous phase comprises HClO$_4$ at a concentration ranging from 4 M to 6 M, sulfuric acid (H$_2$SO$_4$) at a concentration ranging from 0.5 M to 1.5 M, and iodide ions at a concentration ranging from 0.5 M to 1 M.

14. The method of claim 12 wherein the organic phase comprises benzene or toluene or chloroform saturated with HClO$_4$ at a concentration ranging from 4 M to 6 M and H$_2$SO$_4$ at a concentration ranging from 0.5 M to 1.5 M.

15. The method of claim 12 wherein the volume ratio of aqueous phase to organic phase ranges from 4:1 to 2:1.

16. The method of claim 1 wherein the HCl in step (a) is a 6-10-fold molar excess of boiling HCl.

17. The method of claim 16 wherein hydrogen peroxide (H$_2$O$_2$) is added into said boiling HCl.

18. The method of claim 16 wherein titanium compounds are precipitated from said HCl in step (a) at a concentration ranging from 1 M to 3 M, followed by the filtration of said HCl.

19. The method of claim 1 wherein the remaining portion of the irradiated TiSb is dissolved in an aqueous solution comprising a 6-10-fold molar excess of HCl and a volume of HNO$_3$.

20. The method of claim 19 wherein a volume of HNO$_3$ added is one-seventh a volume of HCl.

21. The method of claim 19 wherein the combined aqueous solution is filtered.

22. The method of claim 19 wherein HNO$_3$ is removed by heating.

23. The method of claim 1 wherein the organic phase comprises dibutyl ether saturated with HCl at a concentration ranging from 9 M to 12 M.

24. A method of recovering $^{117m}$Sn from irradiated TiSb comprising dissolving at least a portion of irradiated TiSb in a strong acid to form a first solution;
    subjecting said first solution to an aqueous/organic phase separation and recovering a formed aqueous phase;
    separating $^{117m}$Sn from said aqueous phase with an ion exchange sorbent.

* * * * *

UNITED STATES PATENT AND TRADEMARK OFFICE
CERTIFICATE OF CORRECTION

| | |
|---|---|
| PATENT NO. | : 8,097,064 B2 |
| APPLICATION NO. | : 12/425038 |
| DATED | : January 17, 2012 |
| INVENTOR(S) | : Elena V. Lapshina et al. |

It is certified that error appears in the above-identified patent and that said Letters Patent is hereby corrected as shown below:

Title page, Item (54), and Col. 1, line 3, TITLE:
"METHODS FOR CHEMICAL RECOVERY OF NON-CARRIER-ADDED RADIOACTIVE TIN FROM IRRADIATED INTERMETALLIC TI-SB TARGETS" should read --METHODS FOR CHEMICAL RECOVERY OF NO-CARRIER-ADDED RADIOACTIVE TIN FROM IRRADIATED INTERMETALLIC TI-SB TARGETS--

Col. 1, line approx. 13-15
"chemistry, and more specifically, to" should read --chemistry and, more specifically, to--

Col. 3, line approx. 44
"will be apparent form the" should read --will be apparent from the--

Col. 4, line approx. 37-38
"can be washed out with 5-7 M HCl Sn can" should read --can be washed out with 5-7 M HCl. Sn can--

Col. 5, line approx. 8
"by careful mixing the reagents" should read --by careful mixing of the reagents--

Col. 5, line approx. 44-45
"subjected to one additional ... runs to ..." should read --subjected to one additional... run to...--

Col. 6, line approx. 49
"ml/min, NCA radiotin can" should read --ml/min. NCA radiotin can--

Col. 10, line 6 CLAIM 8
"wherein radiotin in said column" should read --wherein NCA radiotin in said column--

Signed and Sealed this
Thirtieth Day of October, 2012

David J. Kappos
*Director of the United States Patent and Trademark Office*